United States Patent [19]
Weed et al.

[11] Patent Number: 5,831,522
[45] Date of Patent: *Nov. 3, 1998

[54] PORTABLE VISUAL EMERGENCY SIGNAL DEVICE

[76] Inventors: Leonard E. Weed, 10405 Oklahoma Ave., Chatsworth, Calif. 91311; Ronald J. Weed, 3844 W. Channel Islands Blvd., Channel Islands Harbor, Calif. 93001; Dwight V. Call, 18935 Granada Cir., Northridge, Calif. 91326

[ * ] Notice: This patent issued on a continued prosecution application filed under 37 CFR 1.53(d), and is subject to the twenty year patent term provisions of 35 U.S.C. 154(a)(2).

[21] Appl. No.: 779,042

[22] Filed: Jan. 6, 1997

Related U.S. Application Data

[63] Continuation of Ser. No. 428,909, Apr. 25, 1995, Pat. No. 5,627,513.

[51] Int. Cl.⁶ ............................... B60Q 7/00; G08G 1/00
[52] U.S. Cl. ......................... 340/473; 340/471; 340/474; 340/908; 340/321; 340/691; 340/478; 116/63 P; 116/63 T
[58] Field of Search ................................. 340/473, 471, 340/422, 908, 908.1, 932, 478, 321, 691, 692, 636, 474; 116/63 R, 63 P, 63 T; 40/612, 605, 573, 558; 362/109, 157, 162, 169

[56] References Cited

U.S. PATENT DOCUMENTS

| | | | |
|---|---|---|---|
| 3,193,817 | 7/1965 | Olewine | 340/321 |
| 3,599,201 | 8/1971 | Clardy et al. | 340/326 |
| 3,805,049 | 4/1974 | Frank et al. | 240/10 R |
| 3,822,668 | 7/1974 | Schradieck et al. | 116/63 P |
| 3,863,236 | 1/1975 | Clardy | 340/227 R |
| 4,047,165 | 9/1977 | Andreasson et al. | 116/63 T |
| 4,440,104 | 4/1984 | Bleiweiss et al. | 340/331 |
| 4,547,761 | 10/1985 | Jones | 340/691 |
| 4,613,847 | 9/1986 | Scolari et al. | 340/473 |
| 4,801,928 | 1/1989 | Minter | 40/575 |
| 4,827,245 | 5/1989 | Lipman | 340/473 |
| 4,829,191 | 5/1989 | Ching-Hwei | 340/475 |
| 4,875,028 | 10/1989 | Chou . | |
| 4,901,461 | 2/1990 | Edwards et al. . | |
| 4,952,910 | 8/1990 | Straten et al. | 340/473 |
| 4,981,363 | 1/1991 | Lipman | 362/68 |
| 4,993,058 | 2/1991 | McMinn et al. | 379/37 |
| 5,457,449 | 10/1995 | Kuning et al. | 340/908 |

*Primary Examiner*—Donnie L. Crosland
*Attorney, Agent, or Firm*—Fulwider Patton Lee & Utecht, LLP

[57] ABSTRACT

A portable visual emergency signal device for generally indicating caution and for providing a beacon to guide emergency vehicles or personnel to an emergency site. The emergency signal device is sectioned into a plurality of wedges, each wedge having a translucent faceted face and a distinct color. The emergency signal device also contains a plurality of sequentially fired lamps and at least one reflective surface cooperating with the lamps to facilitate propagation of light energy. The emergency signal device further includes a battery and an alarm cooperating with the battery to indicate a low battery.

16 Claims, 4 Drawing Sheets

PORTABLE VISUAL EMERGENCY SIGNAL DEVICE

This is a continuation of application Ser. No. 08/428,909, filed Apr. 25, 1995 now U.S. Pat. No. 5,627,513.

BACKGROUND OF THE INVENTION

1. Field of the Invention:

This invention relates generally to visual emergency signal devices and more particularly to such devices featuring sequentially flashing high intensity lamps radiating as a multiple color attraction.

2. Description of Related Art:

Often, emergency vehicles and personnel responding to emergency situations find it difficult to locate the actual scene of the emergency. Further, there is often no means available at an emergency site to ward off unwary passersby from falling prey to possible dangers existing at the emergency site.

Generally, geographic markings or other graphic representations for identifying an emergency site, are seldom lighted or are not easily visible. As a result, emergency personnel or vehicles can easily miss a geographic marking of a building from the street. Should the emergency arise in a desolate location, such marking may be entirely missing and emergency personnel may have further difficulties in locating the site of the emergency.

With the advancement of our society, the ability to respond to emergency situations has improved. Systems have been set up for improving response times to emergencies so that emergency personnel such as paramedics, the police, and the fire department can quickly respond to the particular emergency. In particular, with the recent widespread use of the 9-1-1 emergency telephone system, emergency personnel are provided the capability to quickly respond to an emergency. Moreover, medical technology has advanced so that harm to human health from various traumas can be minimized and lives can now be saved in situations where it was unlikely to do so before.

Life and death, however, is often measured during those crucial moments when emergency personnel are searching for the actual location of the emergency. Of course, once the first emergency vehicle is parked at the location, it serves as a beacon for those following by using some type of rotating light radiating brilliant flashes of multiple colors. Also, the emergency vehicle serves as a warning to passersby to proceed cautiously. Nevertheless, prior to the emergency personnel reaching the site of the emergency, there is often no means to direct personnel to the site of the emergency or to provide a warning of the emergency. Should the personnel responding to the emergency be sufficiently delayed, personal property or human life can be lost regardless of the advances made in medicine and emergency response systems.

Hence, there remains a need for a visual signal device that will operate to not only aid emergency personnel to locate the emergency site, but to provide a warning of the emergency condition. Further, due to the fact that emergencies can occur in the home, at work or on vacation, there is a need for an emergency signal device that is portable, so that help can be summoned wherever it is needed. Moreover, it is desirable that the signal device be available at a reasonable cost and operate to unequivocally signal an emergency condition so that lives and property may be protected. The present invention fulfills all of these needs.

SUMMARY OF THE INVENTION

Briefly, and in general terms, the present invention provides a novel portable visual emergency signal device. Basically, the present invention is directed to a signal device for generally indicating caution and for providing an initial beacon to guide emergency vehicles or personnel to the site of an emergency.

The portable visual emergency signal device of the present invention embodies a generally triangular shape that is internationally recognized as indicating caution. The signal device further incorporates the colors of red, amber and blue, which are internationally recognized as indicating an emergency.

Additionally, the triangular signal device includes a transparent faceted face that is sectioned into three wedges, each wedge having one of the colors of red, amber and blue. Within each wedge is a sequentially fired lamp and at least one reflective surface for facilitating the propagation of the light provided by the lamps. The lamps may be timed to flash sequentially every half second and may have a designed visibility range of 500 ft. during the day (unobstructed) and 2,000 ft. at night (unobstructed). The signal device also includes a rechargeable battery for supplying power and an alarm in communication with the battery for indicating a low battery charge. The signal device will operate continuously for at least 2 hours on the rechargeable battery.

The signal device is further designed to be either freestanding, mounted on its tripod base or suspended by an eye molded into its structure. Moreover, the signal device incorporates a lighting system utilizing a high-voltage circuit composed of a single pole, single throw, rotary type switch, a capacitor charging unit to fire the lamps and three integrated circuit timers to control the capacitor charging unit.

In other embodiments of the present invention, the overall shape of the emergency signal device may vary. In particular, the emergency signal device may embody a circular or oval shape as well as other multiple sided shapes such as a quadrilateral, a pentagon and a hexagon or other irregularly shaped multiple sided figures.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENTS

Figure 1:
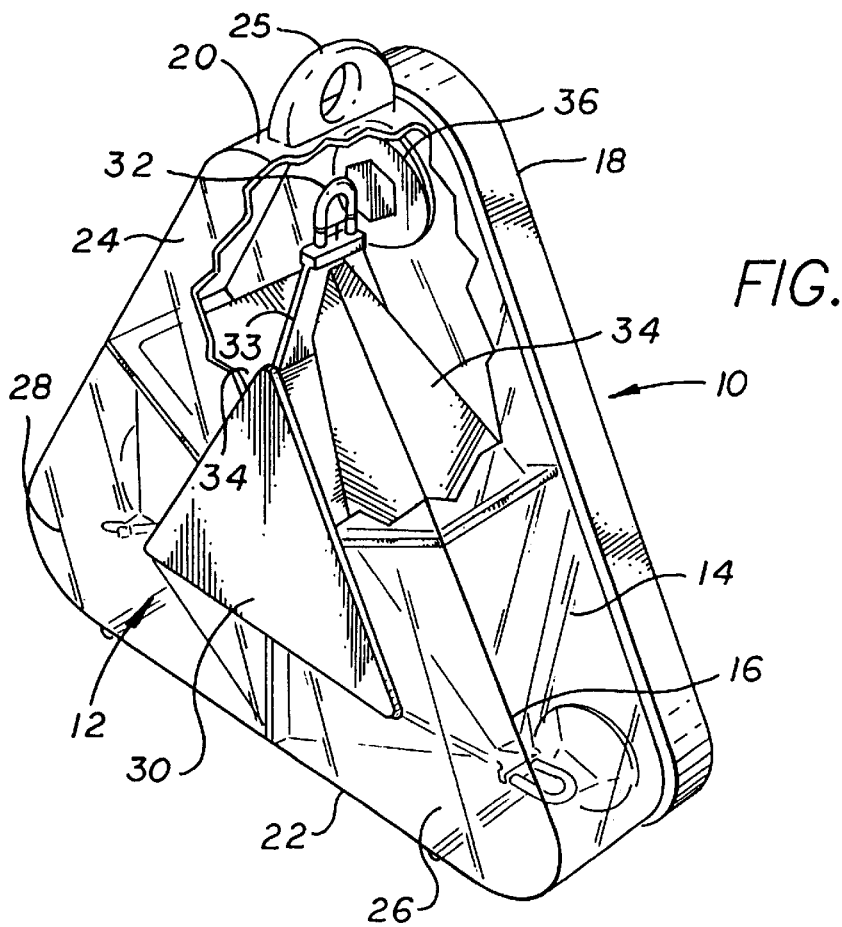
FIG. 1 is a partial cross-sectional perspective view of the present invention, illustrating a portable visual emergency signal device.

As is shown in the drawings, which are included for purposes of illustration and not by way of limitation, the invention is embodied in a portable visual emergency signal device. Referring now to FIG. 1, there is shown a presently preferred embodiment of the portable visual emergency signal device 10. The signal device 10 is generally triangular in shape and includes a triangular faceted face 12, a sidewall 14 extending from a perimeter 16 of the face 12 and a backplate 18 spaced apart from the face 12. In the presently preferred embodiment, each side of the triangular-shaped face 12 is approximately twelve (12) inches in length. The top 20 of the triangular signal device 10 is defined by one of its corners and the bottom 22, which is defined by the perimeter 16 of the face 12 and the sidewall 14, is one of the sides of the triangular signal device 10.

The face 12 and corresponding portions of the sidewall 14 extending therefrom, are sectioned into three wedges, each wedge comprising one corner of the triangular shaped signal device 10 and each embodying a translucent material. A first wedge 24 includes the top 20 of the signal device 10 and has a translucent amber color. Formed at the top 20 of the signal device 10 is an eye 25 for hanging or carrying the signal device 10. A second wedge 26 includes half of the bottom 22 of the signal device 10 and has a translucent red color. The third wedge 28 comprises the other half of the bottom 22 of the signal device 10 and is translucent blue in color. Located at the fulcrum or center of the signal device is a front triangular opaque plate 30. The triangular opaque plate 30 is small relative to the triangle formed by the three wedges 24, 26, 28 and its surface provides a space for identifying the signal device 10 with text.

Within each of the wedges 22, 24, 26, there is located a high intensity lamp or flashlamp 32 mounted on an internal frame 33. Also contained in each wedge are a plurality of reflective surfaces. Further, mounted upon the internal frame 33 are angled reflective surfaces 34 which extend away from each flashlamp 32. Additionally, a circular reflective surface 36 is mounted directly behind each flashlamp 32.

Although the presently preferred embodiment of the emergency signal device 10 is described as being triangular in shape, in other contemplated embodiments, the signal device may have various other shapes (not shown). For instance, the signal device 10 may have a circular or oval shape. Further, it is contemplated that the signal device may embody various multiple sided shapes such as a quadrilateral, a pentagon, a hexagon or other irregularly shaped multiple sided figures. Irrespective of the embodiment, however, in every case, the signal device 10 is contemplated as including a plurality of translucent wedges, each having a distinct color, as well as a plurality of sequentially fired lamps.

Figure 2:
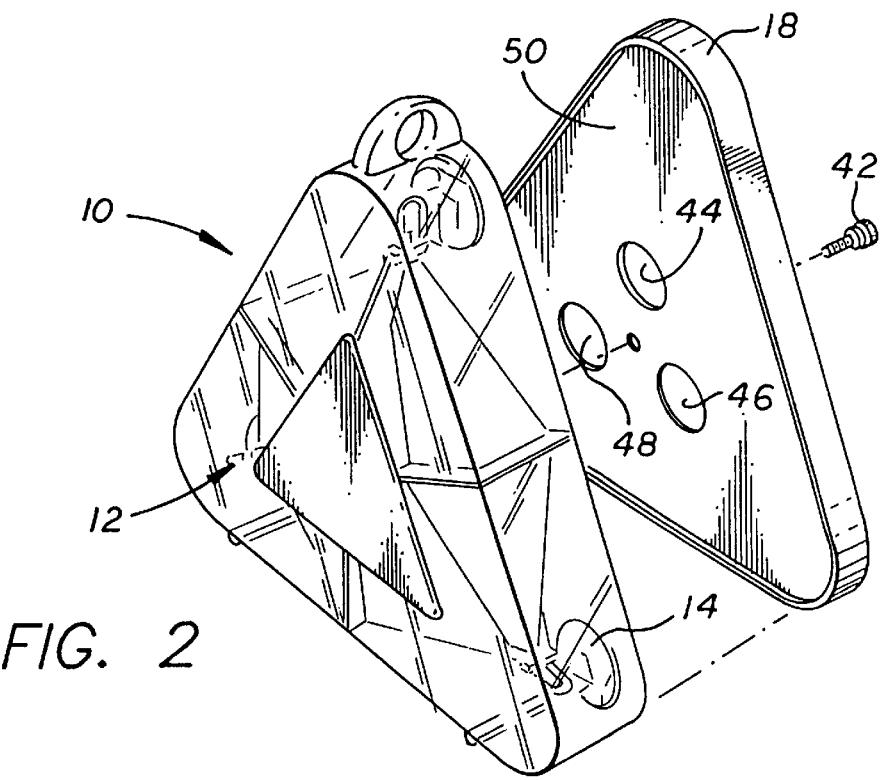
FIG. 2 is a perspective view of the emergency signal device shown in FIG. 1 with its backplate detached.

Referring to FIG. 2, there is shown the backplate 18 detached from the face 12 and sidewalls 14 of the signal device 10. A thru-hole 40 is formed in the center of the backplate 18 which provides a space through which a conventional thumb screw 42 is mounted so as to hold the backplate in position on the signal device 10. The backplate 18 also includes three circular apertures 44, 46, 48 positioned about thru-hole 40 and a reflective surface 50.

Figure 3:
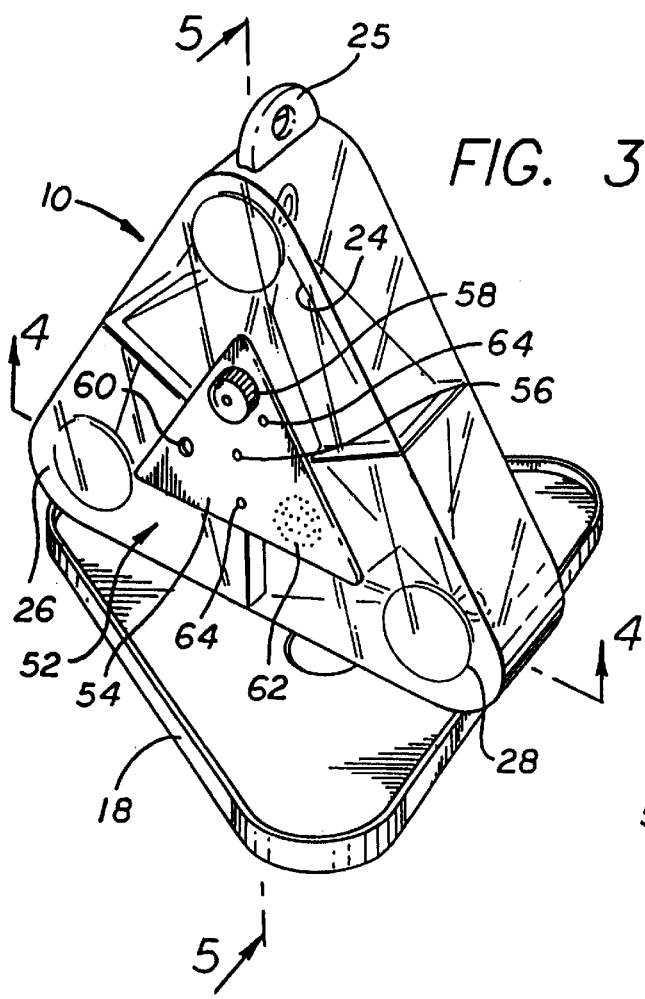
FIG. 3 is a perspective rear view of the emergency signal device of FIG. 2.

Turning now to FIG. 3, there is shown an internal rear side 52 of the signal device 10. In the presently preferred embodiment, the colored translucent material of the signal device 10 that comprises the face 12 and sidewall 14 also comprises the internal rear side 52. Accordingly, the internal rear side 52 is sectioned into wedges of a like configuration to that of a face 12. Positioned in the fulcrum or center of the internal rear side 52, is a rear triangular opaque plate 54. Formed in the center of the rear plate 54 is a threaded hole 56 that is adapted for receiving the thumb screw 42. Positioned vertically above threaded hole 54 is a single pole single throw rotary type switch 58. To either side of the threaded hole 56 are a battery recharging access hole 60 and a plurality of speaker holes 62 respectively. Also formed in the rear triangular plate 54 are a number of screw holes 64 through which screws may be inserted in order to attach the rear triangular plate 54 to the front triangular plate 30. Moreover, by reviewing FIGS. 2 and 3 in conjunction, it may be recognized that the three circular apertures 44, 46, 48 formed in the backplate 18 provide access to the single pole, single throw, rotary type switch 58, the battery recharge access hole 60 and the speaker holes 62 respectively.

Figure 4:
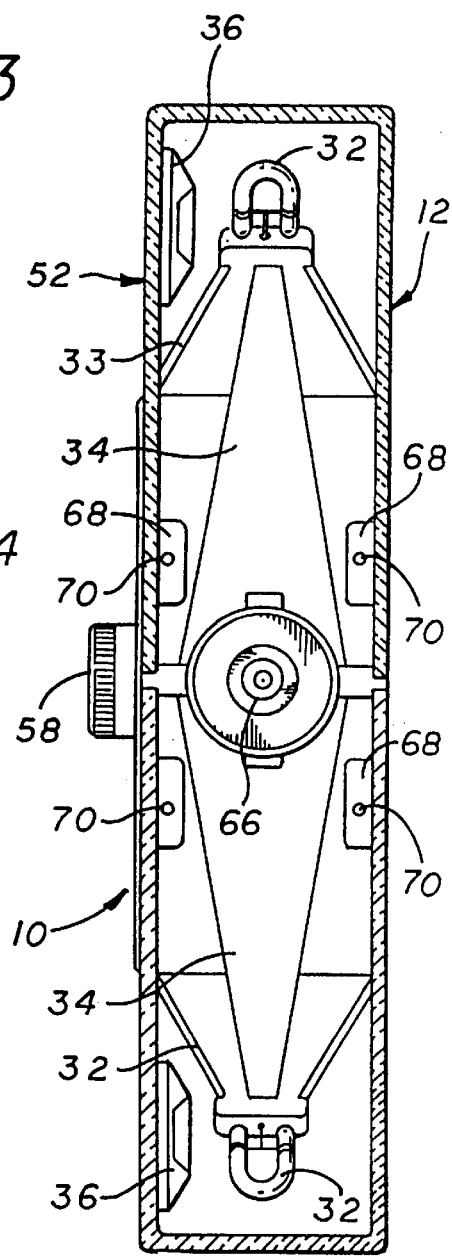
FIG. 4 is a cross-sectional view of the emergency signal device of FIG. 3 taken along the lines 4—4.

As is shown in FIG. 4, the bottom 22 of the signal device 10 includes a threaded insert 66 for attaching the signal device 10 to its backplate 18. The thumb screw 42 holding the back-plate 18 to the internal rear side 52 of the signal device 10 can be removed and reused to attach the backplate 18 to the bottom 22 of the signal device 10. In this way, where the backplate 18 is configured to have three spaced-apart raised portions, the backplate 18 can function as a tripod for the signal device 10.

As is also shown in FIG. 4, the translucent wedges 24, 26, 28 include tabs 68 each with a thru-hole 70. The internal frame 32 includes corresponding threaded holes (not shown) that receive threaded portions of the screws (not shown) that are inserted into the thru-holes 70 in order to attach the wedges 24, 26, 28 to the internal frame 33.

Figure 5:
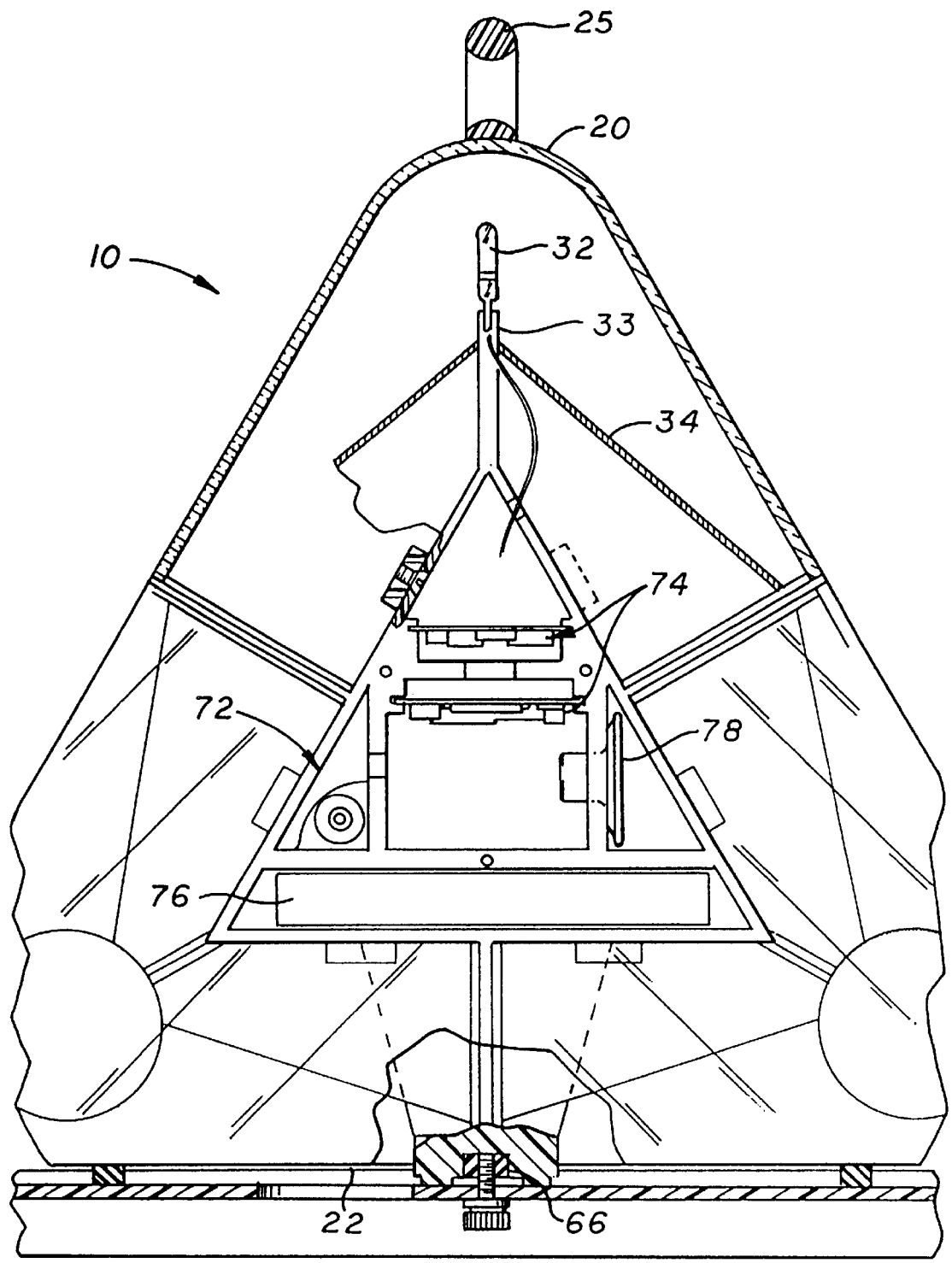
FIG. 5 is a cross-sectional view of the emergency signal device of FIG. 3 taken along the lines 5—5.

Referring now to FIG. 5, it is to be appreciated that the front and rear triangular plates 30, 54 define an internal compartment 72. Within the internal compartment 72 are the circuit boards 74, electrical wires (not shown), and a rechargeable battery 76 which comprise the high-voltage circuit that controls and drives the flashlamps 32. Also mounted within the internal compartment 72 is a speaker 78 which sounds a signal when the rechargeable battery 76 has a low charge. Further, it is to be recognized that the rechargeable battery 76 and other electrical components are accessible by merely removing the rear triangular plate 54.

Figure 6:
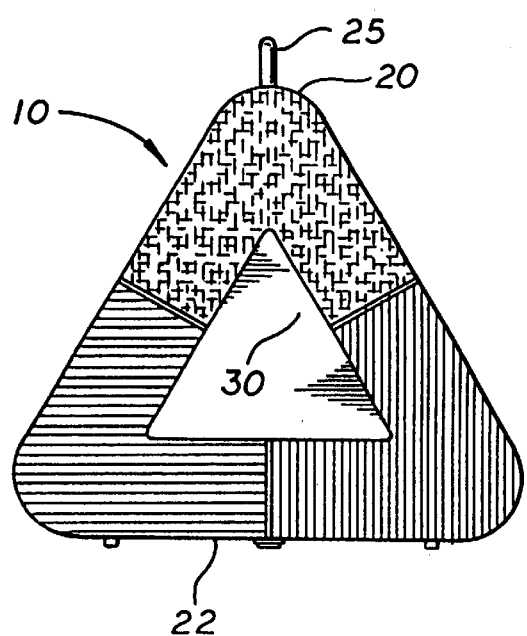
FIG. 6 is a front view of the emergency signal device shown in FIG. 1.

As represented in FIG. 6, the visual emergency signal device 10 is contemplated to comprise wedges having three distinct colors. The presently preferred embodiment of the signal device 10 has been described as having blue, amber and red wedges since those colors are internationally recognized as indicating an emergency. However, it is contemplated that the emergency signal device 10 may embody any three distinct colors.

Figure 7:
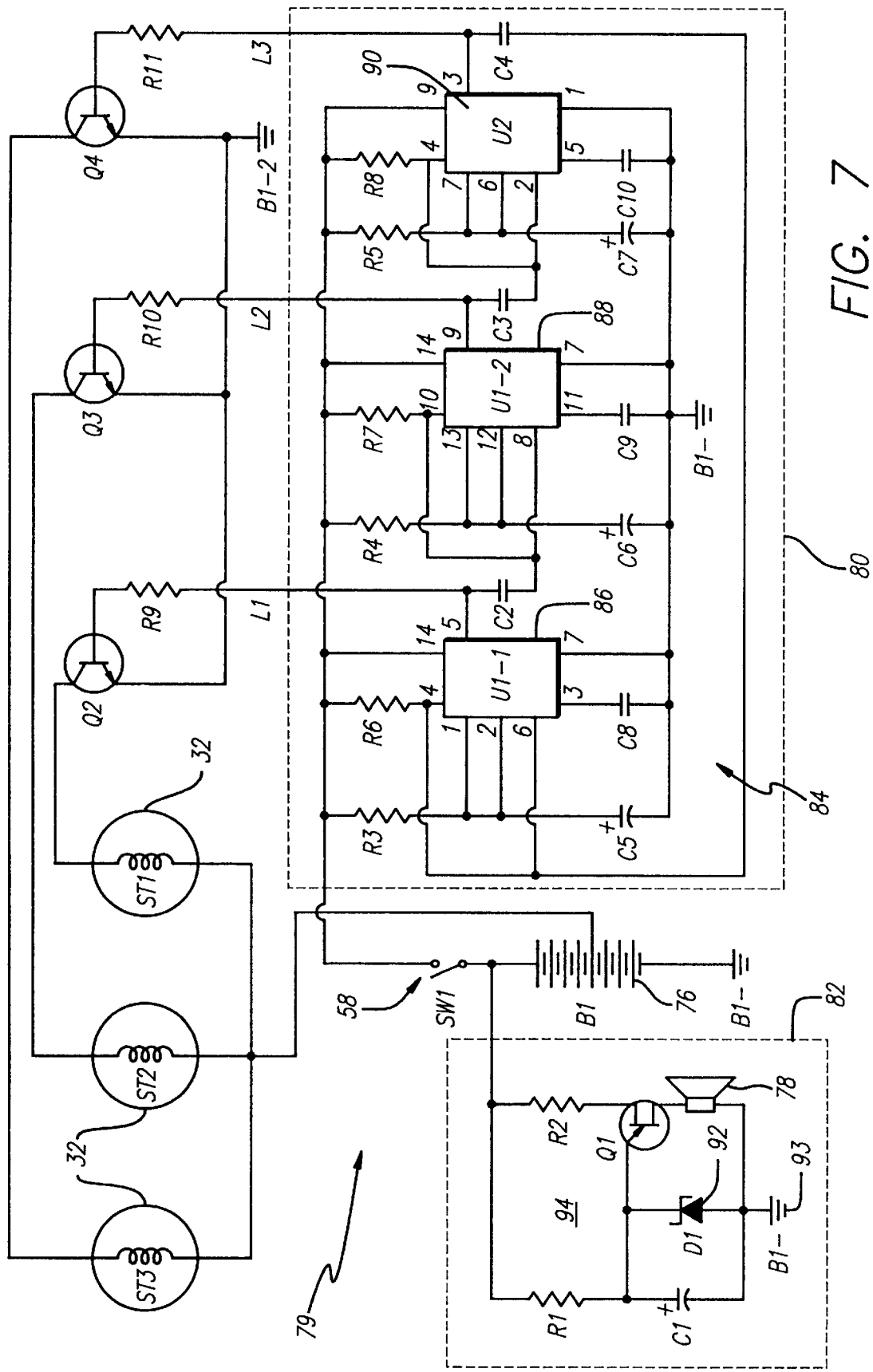
FIG. 7 is a schematic of the circuit controlling and driving the emergency signal device.

The high-voltage circuit 79 controlling and driving the flashlamps 32 include a timing circuit 80 and an alarm circuit 82 (see FIG. 7). The individual components comprising the presently preferred embodiment of the high-voltage circuit 79 depicted in FIG. 7 are listed in Appendix A hereto. Significantly, the high-voltage circuit 79 includes the rechargeable battery 76 comprising three nine (9) volt radio batteries in parallel, the single pole, single throw type switch 58 and three one hundred and twenty (120) volt flashlamps 32. The rechargeable battery 76 is capable of supplying sufficient power so that the signal device 10 can operate continuously for at least two hours.

The timing circuit 80 includes a capacitor charging unit 84 operating to fire the 120 v flashlamps 32 and three integrated circuit timers 86, 88, 90 controlling the charging unit 86. According to the invention, the timing circuit 80 functions to cause the flashlamps 32 to flash sequentially every half second. The 120 v flashlamps are designed to have a visual range of 500 ft. during the day (unobstructed) and 2000 ft. at night (unobstructed).

The alarm circuit 82 includes the speaker 78 and operates to monitor the current of the circuit 79 in order to identify when the rechargeable battery 76 has a low charge. Generally, when the battery 76 is sufficiently charged, the current supplied by the battery 76 is of a great enough magnitude so that it passes through a zener diode 92 and to ground 93. When the current of the circuit 79 falls below a certain pre-determined level, the current is insufficient to pass through the zener diode 92 and instead passes through a field effect transistor 94, which operates to direct the current to the speaker 78. The speaker 78, in turn, provides an audible alarm to the user indicating a low battery charge.

From the foregoing, it will be appreciated that the portable visual emergency signal device of the invention operates to provide a beacon to guide emergency vehicles or personnel to the site of an emergency as well as generally indicates caution. Due to its triangular shape and use of sequentially fired high intensity lamps within distinctly colored translucent colored wedges, the emergency signal device functions to unequivocally signal an emergency condition so that lives and property may be protected.

While a particular form of the invention has been illustrated and described, it will also be apparent that various modifications can be made without departing from the spirit and scope of the invention. Accordingly, it is not intended that the invention be limited, except by the appended claims.

We claim:

1. A portable visual emergency signal device, comprising:
   a portable housing;
   a plurality of lantern portions disposed in said portable housing, each of said lantern portions comprising a flashlamp, a first reflector surface mounted directly behind each flashlamp, and a second reflector disposed within said housing adjacent to said flashlamp, each said second reflector having a plurality of corresponding reflective surfaces extending away from each said flashlamp, each of said plurality of corresponding reflective surfaces reflecting light respectively from each said flashlamp in a different direction, and each of said lantern portions providing light of a color selected from a plurality of different colors;
   at least one battery connected to said plurality of lantern portions for operation of said plurality of lantern portions; and
   a timing circuit connected to said at least one battery and said plurality of lantern portions for causing said plurality of lantern portions to flash sequentially.

2. The device of claim 1, wherein said plurality of colors comprises at least three different colors.

3. The device of claim 1, wherein said plurality of colors comprises amber, blue and red.

4. The device of claim 1, where in said housing comprises a backplate, and each said lantern portion comprises a face and a sidewall, said face being spaced apart from said backplate, and said sidewall extending from a perimeter of said face toward said backplate.

5. The device of claim 1, further including an alarm circuit connected to said at least one battery for indicating a low battery.

6. The device of claim 1, wherein each of said plurality of lantern portions comprises a reflective surface mounted directly behind each flashlamp.

7. A portable visual emergency signal device, comprising:
   a portable housing;
   a plurality of lantern portions disposed in said portable housing, each of said lantern portions comprising a flashlamp, a first reflector surface mounted directly behind each flashlamp, and a second reflector disposed within said housing adjacent to said flashlamp, each said second reflector having a plurality of corresponding reflective surfaces extending away from each said flashlamp, each of said plurality of corresponding reflective surfaces for each said flashlamp reflecting light respectively from each said flashlamp in a different direction, and each of said lantern portions providing light of a color selected from a plurality of different colors;
   at least one battery connected to said plurality of lantern portions for operation of said plurality of lantern portions;
   a timing circuit connected to said at least one battery and said plurality of lantern portions for causing said plurality of lantern portions to flash sequentially; and
   an alarm circuit connected to said at least one battery for indicating a low battery.

8. The device of claim 7, wherein said plurality of colors comprises at least three different colors.

9. The device of claim 7, wherein said plurality of colors comprises amber, blue and red.

10. The device of claim 7, wherein said housing comprises a backplate, and each said lantern portion comprises a face and a sidewall, said face being spaced apart from said backplate, and said sidewall extending from a perimeter of said face toward said backplate.

11. The device of claim 7, wherein each of said plurality of lantern portions comprises a reflective surface mounted directly behind each flashlamp.

12. A portable visual emergency signal device, comprising:
   a portable housing having a plurality of lantern portions, each of said lantern portions providing light of a color selected from a plurality of different colors;
   a flashlamp disposed in each of said lantern portions;
   a first reflector mounted directly behind each said flashlamp;
   a second reflector disposed within said housing adjacent to each said flashlamp, each said second reflector having a plurality of corresponding angled reflective surfaces extending away from each said flashlamp, and each of said plurality of corresponding angled reflective surfaces for each said flashlamp reflecting light respectively from each said flashlamp in a different direction;
   at least one battery connected to each of said flashlamps for operation of said flashlamps;
   a timing circuit connected to said at least one battery and said flashlamps for causing said flashlamps to flash sequentially; and
   an alarm circuit connected to said at least one battery for indicating a low battery.

13. The device of claim 12, wherein said plurality of colors comprises at least three different colors.

14. The device of claim 12, wherein said plurality of colors comprises amber, blue and red.

15. The device of claim 12, wherein said housing comprises a backplate, and each said lantern portion comprises a face and a sidewall, said face being spaced apart from said backplate, and said sidewall extending from a perimeter of said face toward said backplate.

16. The device of claim 12, wherein each of said plurality of lantern portions comprises a reflective surface mounted directly behind each flashlamp.

* * * * *